(12) United States Patent
Hasegawa

(10) Patent No.: US 8,063,974 B2
(45) Date of Patent: Nov. 22, 2011

(54) METHOD FOR FIXING A PRISM AND A SOLID-STATE IMAGE PICKUP ELEMENT

(76) Inventor: Takami Hasegawa, Yokohama (JP)

( * ) Notice: Subject to any disclaimer, the term of this patent is extended or adjusted under 35 U.S.C. 154(b) by 0 days.

(21) Appl. No.: 12/659,206

(22) Filed: Mar. 1, 2010

(65) Prior Publication Data
US 2010/0212825 A1    Aug. 26, 2010

Related U.S. Application Data

(63) Continuation of application No. 10/592,794, filed as application No. PCT/JP2004/009482 on Jun. 29, 2004, now abandoned.

(51) Int. Cl.
*H04N 9/07* (2006.01)
(52) U.S. Cl. .......................... 348/336; 337/338
(58) Field of Classification Search .................. 348/373, 348/337, 338, 336
See application file for complete search history.

(56) References Cited

U.S. PATENT DOCUMENTS

| 4,789,891 | A | * | 12/1988 | Kanayama et al. | 348/337 |
| 5,134,468 | A | * | 7/1992 | Ohmuro | 348/337 |
| 5,953,077 | A | * | 9/1999 | Honey et al. | 348/589 |
| 2002/0051073 | A1 | * | 5/2002 | Paavola et al. | 348/373 |
| 2003/0138132 | A1 | * | 7/2003 | Stam et al. | 382/104 |
| 2005/0001985 | A1 | * | 1/2005 | Kitabayashi | 353/31 |

* cited by examiner

*Primary Examiner* — Sinh Tran
*Assistant Examiner* — Selam Gebriel
(74) *Attorney, Agent, or Firm* — Manabu Kanesaka

(57) ABSTRACT

In fixing prisms for a TV camera and solid-state image pickup element packages, two holding plates are fixed at two sides of each of the prisms, each of the holding plates having a wedge-shaped or semicircular tip surface, and an adhesive is provided in a gap formed by a surface of the solid-state image pickup element package and the wedge-shaped or semicircular tip surface of the holding plate, respectively. Then, relative to light axes, X, Y and Z axes and rotational axes θx, θy and θz for the axes X, Y, and Z of the solid-state image pickup element packages are aligned while inclining the holding plates in a front-rear direction simultaneously. The adhesive is cured by applying light or heat to thereby fix the holding plates, the solid-state image pickup elements and the prisms, respectively.

7 Claims, 9 Drawing Sheets

FIG. 1 (a)
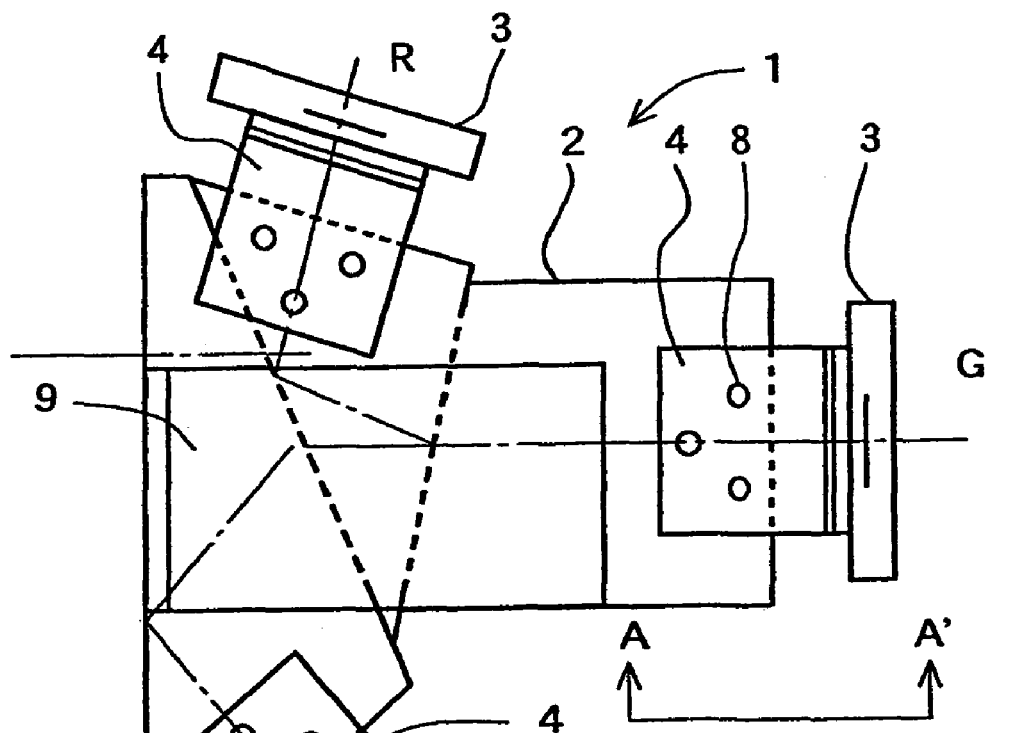
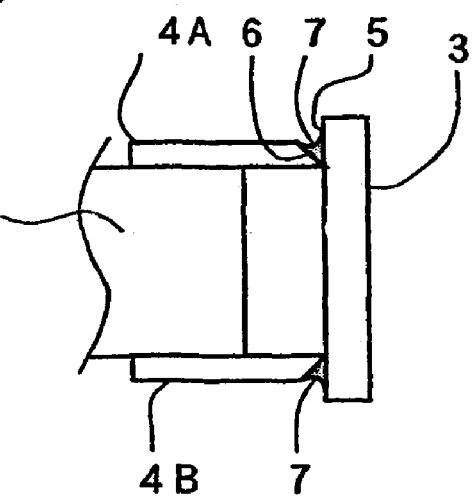
FIG. 1 (b)

METHOD FOR FIXING A PRISM AND A SOLID-STATE IMAGE PICKUP ELEMENT

CROSS-REFERENCE TO RELATED APPLICATION

This is a continuation application of Ser. No. 10/592,794 filed on Sep. 14, 2006 now abandoned.

TECHNICAL FIELD

The present invention relates to a method for fixing a prism and an imaging apparatus in which the prism intended for use in a television camera or the like to allow optical dispersion in a plurality of directions and the solid-state image pickup elements placed in the vicinity of emission planes thereof are bonded and fixed together.

BACKGROUND ART

Currently, in cameras for broadcast use such as television cameras, cameras for business use and cameras for measurement use, prisms are used in a color separation optical system for allowing optical dispersion in a plurality of directions, to form captured optical images on solid-state image pickup elements provided on their emission planes through, for example, dispersion into three primary colors, i.e., blue, red and green. The optical images formed on the solid-state image pickup elements are subjected to photoelectric conversion, and amplified and processed by a video circuit to obtain predetermined video signals.

Such a color separation optical system requires precisely aligning each of three solid-state image pickup elements in relation to six axes X, Y, Z, θx, θy and θz with respect to an optical axis, as shown in a perspective view in FIG. 2 illustrating adjustment directions of a solid-state image pickup element, before bonding and fixing the solid-state image pickup elements to a color separation prism.

A prior known imaging apparatus with bonded and fixed solid-state image pickup elements is disclosed in Prior Art 1: Japanese Laid-Open Utility Model Publication No. 62-47289, titled "ATTACHMENT PLATE FOR COLOR SEPARATION OPTICAL SYSTEM".

Prior Art 1 is described with reference to drawings. FIG. 10(a) is a plan view in which solid-state image pickup elements are attached to a color separation prism in Prior Art 1 via spacers on attachment plates, FIG. 10(b) is a side view in which a solid-state image pickup element is attached to the color separation prism in Prior Art 1 via spacers on an attachment plate, FIG. 11 is an enlarged view of attached portions in Prior Art 1, and FIG. 12 is an enlarged view of attached portions illustrating a variant of the spacer in Prior Art 1.

As shown in FIG. 10, attachment plates 102 are attached so as to sandwich a color separation prism 101 of a color separation optical system 105, and three solid-state image pickup elements 103 are each aligned in relation to the aforementioned six axes, and thereafter, bonded and fixed to the attachment plates 102 via two spacers 104.

In FIG. 11, emission-side end faces of the attachment plates 102 attached to the color separation prism 101 form inclined faces 102A inclined with respect to an emission optical axis. On the other hand, the spacers 104 each have a vertical face 104A formed on the right side and an inclined face 104B formed on the left side, which is inclined with respect to the emission optical axis. As can be seen from FIG. 11, the inclined faces 102A and 104B are formed at approximately the same inclination angle. In addition, gaps required for applying an adhesive are left between the inclined faces 102A and 104B and between the vertical face 104A and a light reception plane-side surface of the solid-state image pickup element 103.

The color separation optical system 105 with such a structure is mounted on an unillustrated 6-axis adjustment jig to adjust the solid-state image pickup element 103 in three axial directions X, Y and Z and three axial rotation directions θx, θy and θz as shown in the perspective view in FIG. 2 illustrating adjustment directions of a solid-state image pickup element package, and thereafter, the vertical faces 104A and the inclined faces 104B of the spacers 104 are applied with an adhesive and inserted into the gaps between the inclined faces 102A of the attachment plates 102 and the solid-state image pickup element 103.

With such a configuration, even if the gaps between the end faces of the attachment plates 102 and the light reception plane-side surface of the solid-state image pickup element 103 are uneven, the spacers 104 are structured to have at least one inclined side face, so that the inclined faces 104B of the spacers 104 are brought into surface contact with the inclined faces 102A of the attachment plates 102, and therefore it is possible to bond them together by using the pair of spacers 104.

In addition, if, as a result of adjustment by the 6-axis adjustment jig, the inclined faces 104B and 102A are inclined at different inclination angles as shown in FIG. 12, it is possible to bring the inclined faces 104B into line contact with the inclined faces 102A and bond them together.

Another example is disclosed in Prior Art 2: Japanese Laid-Open Patent Publication No. 5-37943, titled "SOLID-STATE IMAGE PICKUP APPARATUS".

Prior Art 2 is described with reference to drawings. FIG. 13 is a configuration diagram of a solid-state image pickup apparatus in Prior Art 2, FIG. 14 is an enlarged cross-sectional view of attached portions in Prior Art 2, and FIG. 15 is an enlarged cross-sectional view of attached portions illustrating a variant of a solid-state image pickup element in Prior Art 2.

In FIG. 13, a solid-state image pickup element 203 is fixed on each emission plane of a color separation prism 201 via a pair of connecting/fixing members 204 by applying an adhesive between the color separation prism 201 and the connecting/fixing members 204 and between the connecting/fixing members 204 and the solid-state image pickup element 203, such that the solid-state image pickup element 203 is sandwiched by the connecting/fixing members 204. The color separation prism 201 is coated with a light-shielding paint 202 except for its emission planes.

Filter glass having a characteristic of selectively transmitting ultraviolet light therethrough or membranes for selectively transmitting ultraviolet light therethrough, which are formed by evaporating an optical multilayer film onto white or blue sheet grass, are used for the connecting/fixing members 204 for connecting and fixing together the color separation prism 201 and the solid-state image pickup element 203 placed in the vicinity of an emission plane thereof as shown in FIG. 14, so that only light required for curing the ultraviolet-curable adhesive is transmitted and light in a range that is sensed by the solid-state image pickup element 203 is cut off; the ultraviolet-curable adhesive 205 is applied between the color separation prism 201 and the connecting/fixing members 204 and between the connecting/fixing members 204 and the solid-state image pickup element 203, and after using an unillustrated 6-axis adjustment jig to adjust the solid-state image pickup element 203 in three axial directions X, Y and Z and three axial rotation directions θx, θy and θz as shown in FIG. 2, the adhesive 205 is cured through irradiation with ultraviolet light, thereby connecting and fixing together the color separation prism 201, the connecting/fixing member 204 and the solid-state image pickup element 203.

In addition, if, as a result of adjustment by the unillustrated 6-axis adjustment jig, the solid-state image pickup element 203 is inclined as shown in FIG. 15, the applied ultraviolet-curable adhesive 205 is deformed and cured through irradiation with ultraviolet light, and therefore it is possible to connect and fix together the color separation prism 201, the connecting/fixing member 204 and the solid-state image pickup element 203.

In general, the adhesive has a characteristic of shrinking in volume by several percents when cured, or so-called curing shrinkage, which impairs positional precision at the time of fixation, but the curing shrinkage of an adhesion layer can be counterbalanced by movement of the connecting members, whereby it is possible to cure it while maintaining precision so as not to change the positional relationship between a solid-state image pickup element and a prism block.

The above conventional methods for bonding and fixing a color separation prism and a solid-state image pickup element together, however, have a problem in that, if the amount of applied ultraviolet-curable adhesive is not uniform or ultraviolet light irradiation by the 6-axis adjustment jig is uneven, the curing shrinkage of the ultraviolet-curable adhesive also becomes uneven, so that the solid-state image pickup element is fixed in a position deviating from an original alignment position.

In addition, in cameras for broadcast use, cameras for business use and cameras for measurement use, the number of pixels in a solid-state image pickup element is increased, so that an area per pixel is decreased, and furthermore an imaging area is further decreased from ⅔, ½ or ⅓ inches, therefore the conventional bonding and fixing methods has a difficulty in maintaining high-definition images by preventing alignment error due to the curing shrinkage of the adhesive and positional change due to variations in ambient temperature during operation.

In view of the above-described present situation, the present invention provides a method of fixing a color separation prism and a solid-state image pickup element, wherein even if the amount of applied adhesive is nonuniform, or ultraviolet light irradiation is uneven, or the curing shrinkage of the ultraviolet-curable adhesive also becomes uneven, a positional deviation of the solid-state image pickup element is prevented, while dealing with an increase in number of pixels or reduction in size of the solid-state image pickup element without using a specialized member such as filter glass.

DISCLOSURE OF THE INVENTION

As a result of diligent study in view of the foregoing, the present inventor has solved the problems with the following methods.

A method of fixing prisms for a TV camera and solid-state image pickup element packages comprises fixing two holding plates at two sides of each of the prisms, each of the holding plates having a wedge-shaped or semicircular tip surface, supplying an adhesive in a gap formed by a surface of the solid-state image pickup element package and the wedge-shaped or semicircular tip surface of the holding plate, respectively, said adhesive being photocurable adhesive or thermosetting adhesive, aligning, relative to light axes, X, Y and Z axes and rotational axes θx, θy and θz for the axes X, Y, and Z of each of the solid-state image pickup element packages while inclining the holding plates in a front-rear direction simultaneously, the axes X, Y, and Z being perpendicular to each other, and curing the adhesive by applying light or heat to thereby fix the holding plates, the solid-state image pickup elements and the prisms, respectively.

In the invention, additional holding plates may be directly laminated on the holding plates by an adhesive, which is cured by the light or heat when the holding plates, the solid-state image pickup elements and the prisms are cured.

The method of the invention may further comprises inserting the adhesive and a bar in the gap formed by the surface of the solid-state image pickup element package and the wedge-shaped or semicircular tip surface of the holding plate.

The bar is made of a material selected from the group consisting of transparent glass, ceramic and metal materials, wherein the bar has a thermal expansion coefficient approximating to those of the prisms.

In the method of the invention, the adhesive may contain translucent spherical fillers.

BRIEF DESCRIPTION OF THE DRAWINGS

FIG. 1(*a*) is a configuration diagram in which solid-state image pickup element packages are attached to planar holders of a color separation prism in an embodiment of the present invention, and FIG. 1(*b*) is a side view, taken at A-A', in which a solid-state image pickup element package is attached to a planar holder in Embodiment 1 of the invention.

EXPLANATION OF LETTERS OR NUMERALS

Figure 2:
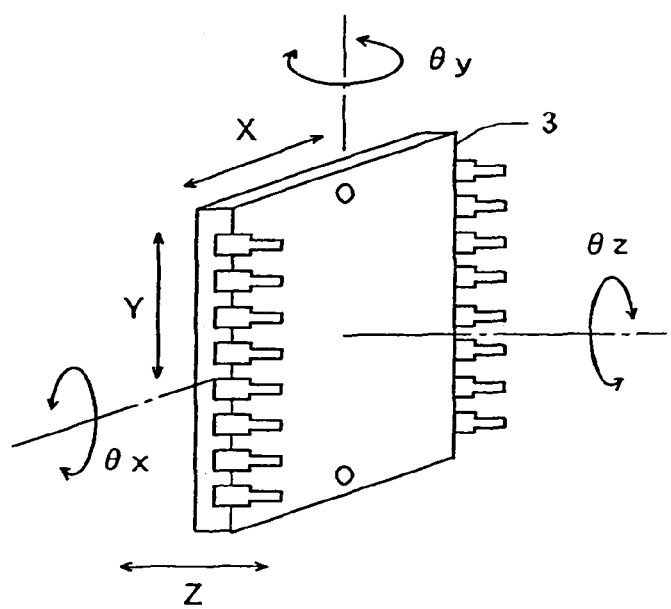
FIG. 2 is a perspective view illustrating adjustment directions of a solid-state image pickup element package.

1: color separation optical system
2: prism
3: solid-state image pickup element package
4, 4A, 4A', 4B, 4B': holder
5: package surface
6, 6': wedge-shaped surface
7, 7': adhesive
8: hole
9: attachment plate
10: tar
11: semicircular surface
101: color separation prism
102: attachment plate
102A: inclined face
103: solid-state image pickup element
104: spacer
104A: vertical face
104B: inclined face
105: color separation optical system
201: color separation prism
202: light-shielding paint
203: solid-state image pickup element
204: connecting/fixing member
205: ultraviolet-curable adhesive

BEST MODE FOR CARRYING OUT THE INVENTION

Embodiments of the present invention will be described with reference to the drawings.

Figure 3:
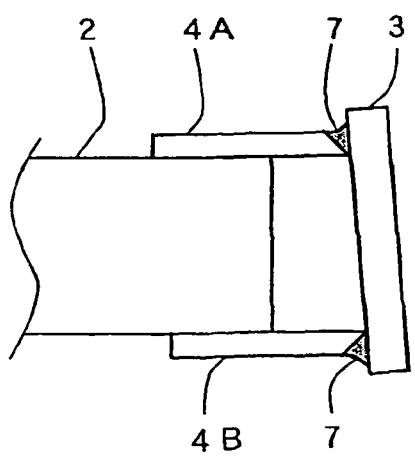
FIG. 3 is a side view, taken at A-A', of Variant 1 in which a solid-state image pickup element package is attached to a planar holder in Embodiment 1 of the invention.
Figure 4:
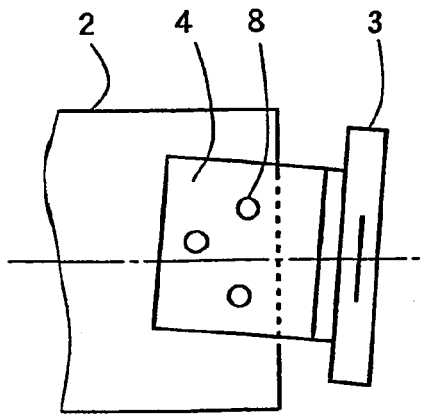
FIG. 4 is a front view, taken at A-A', of Variant 2 in which a solid-state image pickup element package is attached to a planar holder in Embodiment 1 of the invention.
Figure 5:
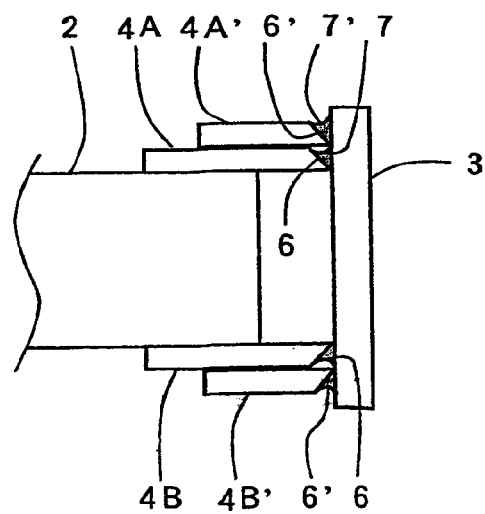
FIG. 5 is a side view, taken at A-A', in which a solid-state image pickup element package is attached to a planar holder in Embodiment 2 of the invention.
Figure 6:
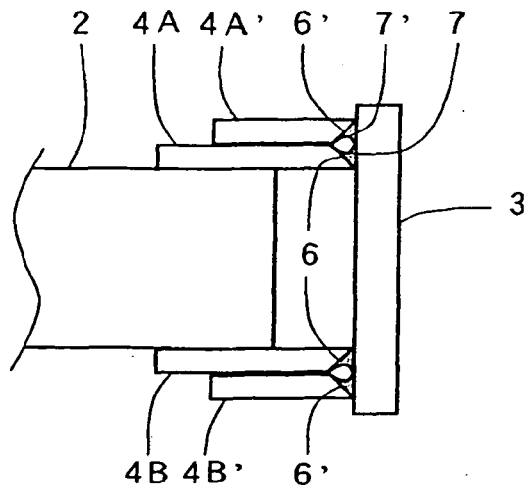
FIG. 6 is a side view, taken at A-A', in which a solid-state image pickup element package is attached to a planar holder in Embodiment 3 of the invention.
Figure 7:
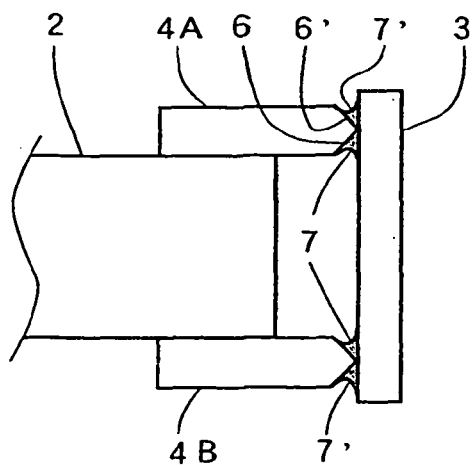
FIG. 7 is a side view, taken at A-A', in which a solid-state image pickup element package is attached to a planar holder in Embodiment 4 of the invention.
Figure 8:
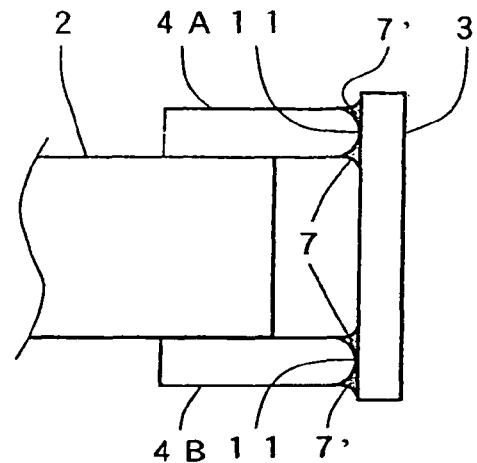
FIG. 8 is a side view, taken at A-A', in which a solid-state image pickup element package is attached to a planar holder in Embodiment 5 of the invention.
Figure 9:
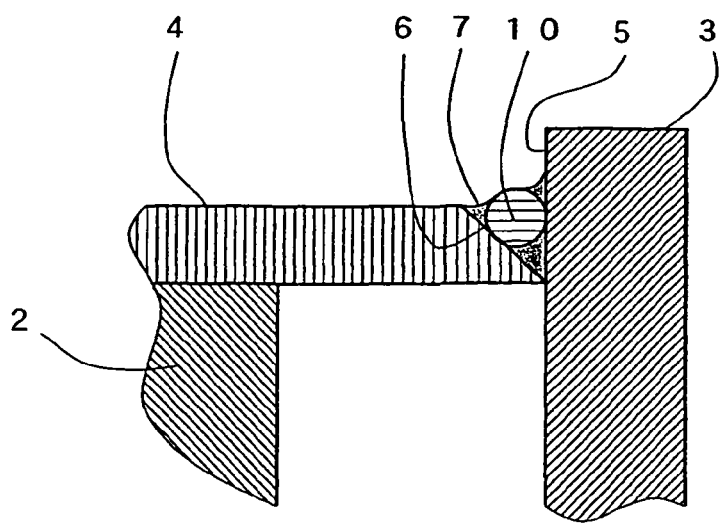
FIG. 9 is an enlarged cross-sectional view of a portion where a solid-state image pickup element package is bonded and fixed to a planar holder in Embodiment 6 of the invention.
Figure 10:
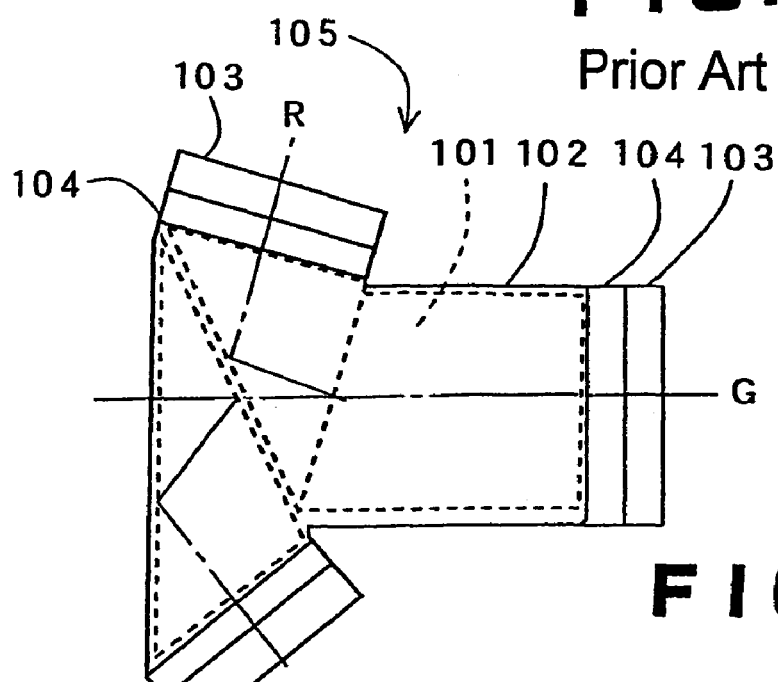
FIG. 10(*a*) is a plan view in which solid-state image pickup elements are attached to a color separation prism in Prior Art 1 via spacers on attachment plates, and FIG. 10(*b*) is a side view in which a solid-state image pickup element is attached to the color separation prism in Prior Art 1 via spacers on an attachment plate.
Figure 10:
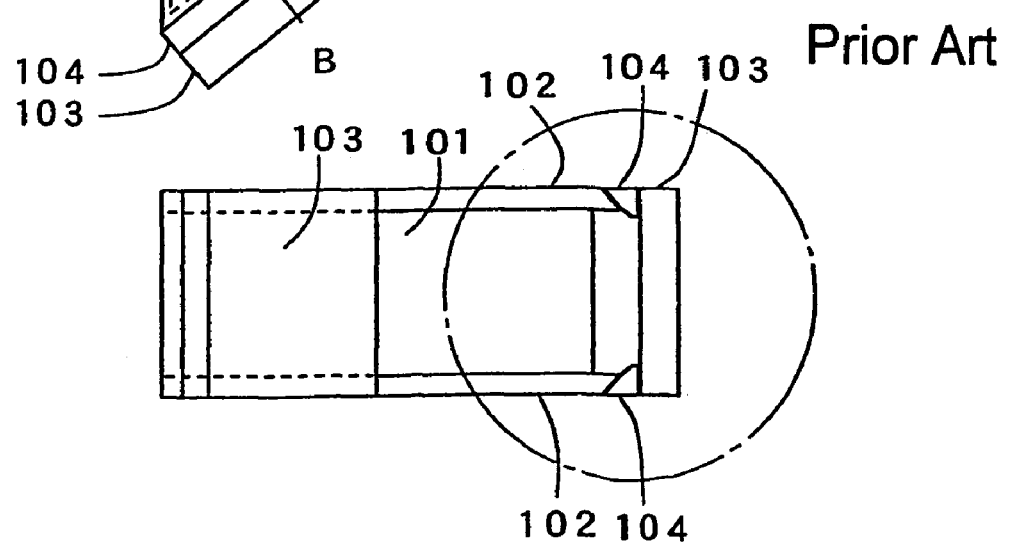
Figure 11:
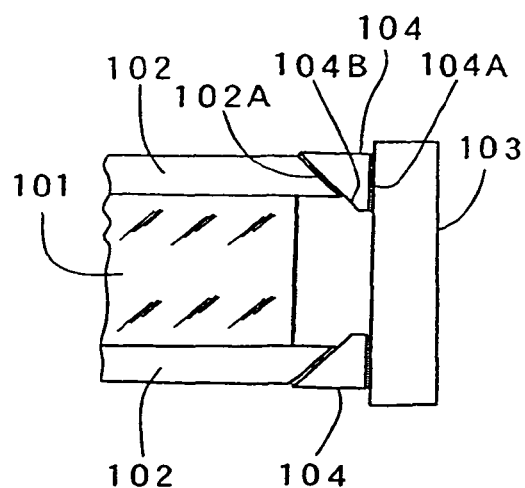
FIG. 11 is an enlarged view of attached portions in Prior Art 1.
Figure 12:
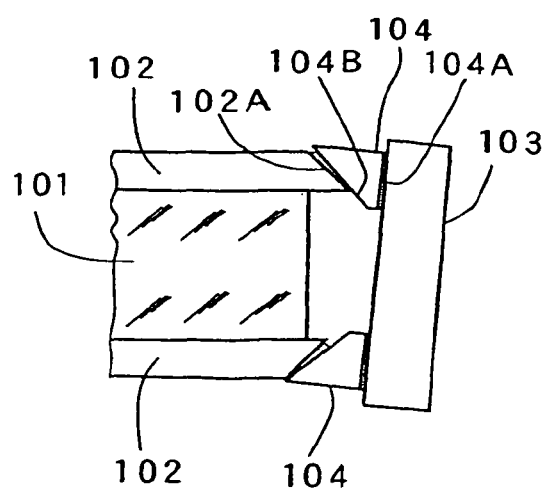
FIG. 12 is an enlarged view of attached portions illustrating a variant of the spacer in Prior Art 1.
Figure 13:
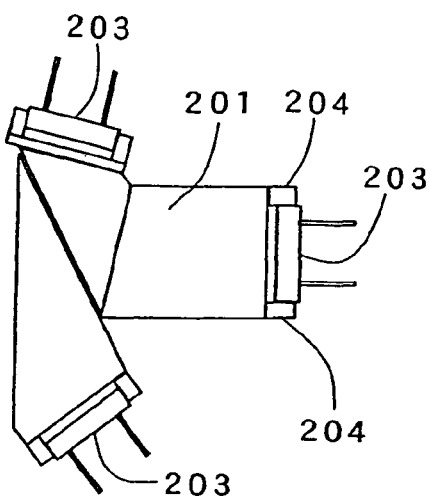
FIG. 13 is a configuration diagram of a solid-state image pickup apparatus in Prior Art 2.
Figure 14:
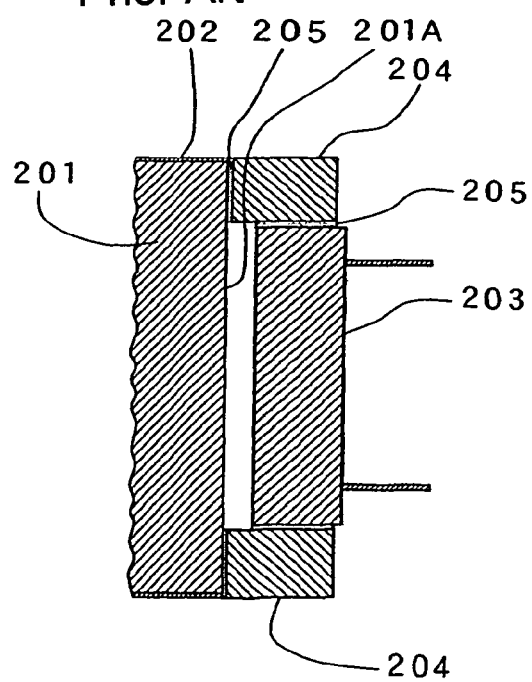
FIG. 14 is an enlarged cross-sectional view of attached portions in Prior Art 2.
Figure 15:
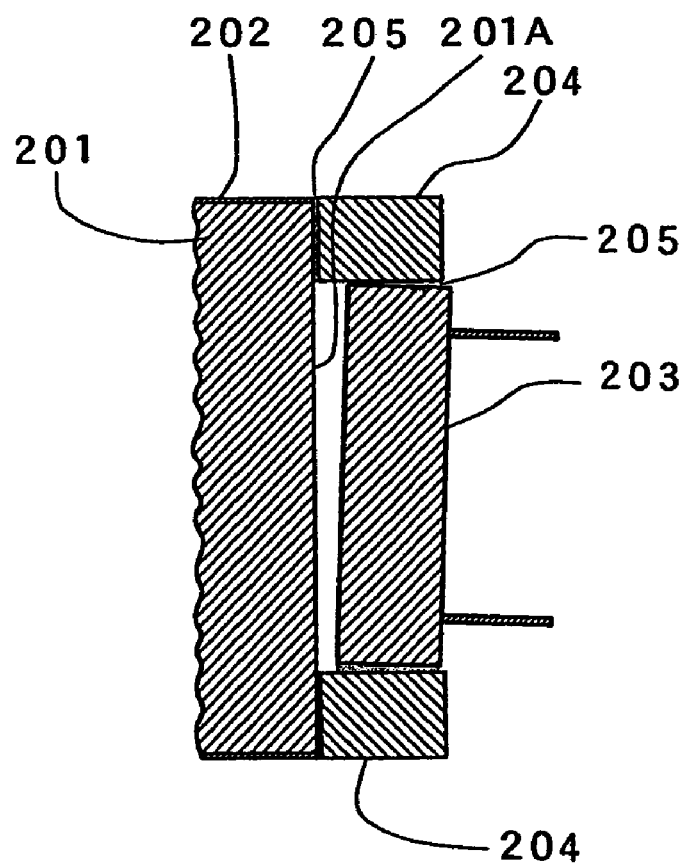
FIG. 15 is an enlarged cross-sectional view of attached portions illustrating a variant of a solid-state image pickup element in Prior Art 2.

FIG. 1(a) is a configuration diagram in which solid-state image pickup element packages are attached to planar holders of a color separation prism in an embodiment of the present invention, FIG. 1(b) is a side view, taken at A-A', in which a solid-state image pickup element package is attached to a planar holder in Embodiment 1 of the invention, FIG. 2 is a perspective view illustrating adjustment directions of a solid-state image pickup element package, FIG. 3 is a side view, taken at A-A', of Variant 1 in which a solid-state image pickup element package is attached to a planar holder in Embodiment 1 of the invention, FIG. 4 is a front view, taken at A-A', of Variant 2 in which a solid-state image pickup element package is attached to a planar holder in Embodiment 1 of the invention, FIG. 5 is a side view, taken at A-A', in which a solid-state image pickup element package is attached to a planar holder in Embodiment 2 of the invention, FIG. 6 is a side view, taken at A-A', in which a solid-state image pickup element package is attached to a planar holder in Embodiment 3 of the invention, FIG. 7 is a side view, taken at A-A', in which a solid-state image pickup element package is attached to a planar holder in Embodiment 4 of the invention, FIG. 8 is a side view, taken at A-A', in which a solid-state image pickup element package is attached to a planar holder in Embodiment 5 of the invention, and FIG. 9 is an enlarged cross-sectional view of a portion where a solid-state image pickup element package is bonded and fixed to a planar holder in Embodiment 6 of the invention.

Embodiment 1

In FIG. 1, a color separation optical system 1 intended for use in a television camera or the like includes: a prism 2 for color separation in three directions; three solid-state image pickup element packages 3 placed in the vicinity of emission planes thereof; planar holders 4 having wedge-shaped tips in contact with light reception plane-side package surfaces 5 of the solid-state image pickup element packages 3, each holder being composed of two pieces of plates bonded to opposite side faces of the prism 2 and made of a transparent glass material having a thermal expansion coefficient approximating to a thermal expansion coefficient of the prism 2; and an adhesive 7 applied to fill triangular gaps so as to connect and fix the holders 4 and the solid-state image pickup element packages 3, the gaps being formed by the solid-state image pickup element package surfaces 5 and surfaces 6 of the wedge-shaped tips of the holders 4 that are inclined to face outward, and the color separation optical system 1 is attached to the back of a front panel of an unillustrated television camera housing via an attachment plate 9.

Note that in order to prevent external disturbing light from being incident on light reception planes of the solid-state image pickup element packages 3, flexible light-shielding films are preferably placed between prisms 2 so as to surround the light reception planes of the solid-state image pickup element packages 3.

The above color separation optical system requires each of the three solid-state image pickup elements to be bonded and fixed to the color separation prism 2 after they are precisely aligned in relation to six axes X, Y, Z, θx, θy and θz with respect to an optical axis as shown in the perspective view in FIG. 2 illustrating adjustment directions of a solid-state image pickup element package 3.

In FIG. 1, the color separation optical system 1 is fixed on the body of an unillustrated 6-axis adjustment jig by the attachment plate 9, and the 6-axis adjustment jig is attached by using the solid-state image pickup element package 3 for an R, G or B channel and one to three jig insertion holes 8 provided in surfaces of a holder 4, or so as to sandwich end faces of the holder 4. The solid-state image pickup element package 3 is adjusted such that the wedge-shaped tips of the holder 4 is always in contact with the surface 5 of the solid-state image pickup element package 3, and the solid-state image pickup element package 3 and the 6-axis adjustment jig on the holder 4 interlock with each other in accordance with a 6-axis adjustment signal.

Upon completion of the precise alignments of the three solid-state image pickup elements in relation to the six axes X, Y, Z, θx, θy and θz with respect to the optical axis, an ultraviolet-curable adhesive 7 is applied to fill the peripheries of the holders 4 each composed of two pieces and triangular gaps formed by package surfaces 5 of the solid-state image pickup elements and wedge-shaped tip surfaces 6 of the holders 4, and the adhesive 7 is cured through irradiation with ultraviolet light, so that the holders 4 and the solid-state image pickup element packages 3 are connected and fixed.

FIG. 3 is a side view, taken at A-A', of Variant 1 in which a solid-state image pickup element package 3 is attached to a holder 4 in Embodiment 1 of the invention; if, as a result of adjustment by the above unillustrated 6-axis adjustment jig, any one of the solid-state image pickup element packages 3 for R, G and B channels requires registration adjustment in a horizontal direction, and the solid-state image pickup element package 3 is inclined, the registration adjustment is performed by moving holders 4A and 4B back and forth with each other by using the 6-axis adjustment jig to incline the solid-state image pickup element package 3, while maintaining the optical axis center of the solid-state image pickup element package 3. Upon completion of the adjustment, an adhesive 7 is cured through irradiation with ultraviolet light in the same manner as described above, thereby connecting and fixing together the holder 4 and the solid-state image pickup element package 3, and similarly, an adhesive is applied around the holder 4 composed of two pieces to connect and fix the prism 2 and the holder 4 together.

FIG. 4 is a front view, taken at A-A', of Variant 2 in which a solid-state image pickup element package is attached to a holder in Embodiment 1 of the invention; if, as a result of adjustments by the above unillustrated 6-axis adjustment jig, any one of the solid-state image pickup element packages 3 for R, G and B channels requires registration adjustment in a vertical direction, and the solid-state image pickup element package 3 is inclined, the registration adjustment is performed by simultaneously inclining holders 4A and 4B with respect to an optical axis by using the 6-axis adjustment jig, while maintaining the optical axis center of the solid-state image pickup element package 3. Upon completion of the adjustment, an adhesive 7 is cured through irradiation with ultraviolet light, thereby connecting and fixing together the holder 4 and the solid-state image pickup element package 3, and similarly, an adhesive is applied around the holder 4 composed of two pieces to connect and fix the prism 2 and the holder 4 together.

As is apparent from the foregoing, by performing adjustment in accordance with a combination of Variants 1 and 2, it is possible to perform precise alignment in relation to six axial directions including three axial directions X, Y and Z and three axial rotation directions θx, θy and θz.

Upon completion of the adjustment in relation to the six axes, unillustrated light-shielding paint is preferably applied around the prism 2 except for its emission planes.

Embodiment 2

In FIG. 5, the holders 4A and 4B described in Embodiment 1 respectively have holders 4A' and 4B' stacked thereon via an adhesive (or by applying an adhesive around the holders) such that wedge-shaped tip surfaces 6 and 6' of the stacked holders 4 are inclined in the same direction; after performing adjustment in relation to six axes in the same manner as described above, the two holders 4 stacked on each other are connected and fixed to a solid-state image pick element package 3 by curing their respective adhesives 7 and 7' through irradiation with ultraviolet light, and similarly, the holders 4 each composed of two pieces are bonded together to connect and fix the prism 2 and the holders 4 together. Other features and actions are the same as in Embodiment 1.

Embodiment 3

In FIG. 6, the holders 4A and 4B described in Embodiment 1 respectively have holders 4A' and 4B' stacked thereon via an adhesive (or by applying an adhesive around the holders) such that wedge-shaped tip surfaces 6 and 6' of the stacked holders 4 are inclined so as to face each other; after performing adjustment in relation to six axes in the same manner as described above, the two holders 4 stacked on each other are connected and fixed to a solid-state image pickup element package 3 by curing their respective adhesives 7 and 7' through irradiation with ultraviolet light, and similarly, the holders 4 each composed of two pieces are bonded together to connect and fix the prism 2 and the holders 4 together. Other features and actions are the same as in Embodiment 1.

Embodiment 4

In FIG. 7, holders 4 are formed by integrating the holders 4A and 4B described in Embodiment 1 with the above-described holders 4A' and 4B', respectively, such that their wedge-shaped tip surfaces 6 and 6' are inclined in opposite directions; after performing adjustment in relation to six axes in the same manner as described above, the holders 4 are connected and fixed to a solid-state image pickup element package 3 by curing their respective adhesives 7 and 7' through irradiation with ultraviolet light, and similarly, the prism 2 and the holders 4 are connected and fixed together. Other features and actions are the same as in Embodiment 1.

Embodiment 5

In FIG. 8, the holders 4A and 4B described in Embodiment 1 have their tips formed with a semicircular surface 11 instead of a wedge-shaped surface; after performing adjustment in relation to six axes in the same manner as described above, the holders 4 are connected and fixed to a solid-state image pickup element package 3 by curing their respective adhesives 7 and 7' through irradiation with ultraviolet light, and similarly, the prism 2 and the holders 4 are connected and fixed together. Other features and actions are the same as in Embodiment 1.

Embodiment 6

In FIG. 9, a holder 4, which is composed of two pieces of plates bonded to side faces of the above-described prism 2 and made of a transparent glass material having a thermal expansion coefficient approximating to a thermal expansion coefficient of the prism 2, has wedge-shaped tips in contact with a light reception plane-side package surface 5 of the above-described solid-state image pickup element package 3; a columnar bar 10 made of a transparent glass material having a thermal expansion coefficient approximating to a thermal expansion coefficient of the prism 2 is placed in a triangular gap, which is formed by the solid-state image pickup element package surface 5 and wedge-shaped tip surfaces 6 of the holder 4 that are inclined to face outward, such that the bar is in contact with the surfaces. After applying an adhesive 7 and performing adjustment in relation to six axes in the same manner as described above, the holder 4 is connected and fixed to the solid-state image pickup element package 3 by curing the adhesive 7 through irradiation with ultraviolet light, and similarly, the prism 2 and the holder 4 are connected and fixed together. Other features and actions are the same as in Embodiment 1.

While the adhesive described in the above embodiments is an ultraviolet-curable adhesive, a photocurable adhesive may also be used, which is capable of bonding and fixing when cured by visible light from a metal halide lamp or the like used as a light source for use in a bonding operation with the 6-axis adjustment jig.

Further, it is expected that, by containing translucent spherical fillers in the adhesive, mechanical characteristics such as hardness are improved and polymerization shrinkage is reduced, resulting in a small thermal expansion coefficient.

While in the above embodiments, a bar 10 and a holder 4 are made of a glass, they may also be made of a ceramic material or a metal material such as titanium, which has a thermal expansion coefficient approximating to a thermal expansion coefficient of a prism 2. In such a case, the adhesive may be a thermosetting adhesive, which is cured by a hot air source or a heat coil to connect and fix together the holder 4 and a solid-state image pickup element package 3, and the prism 2 and the holder 4 are connected and fixed together in a similar manner.

INDUSTRIAL APPLICABILITY

According to the present invention, the following effects can be achieved.

1. According to the invention of the present application, even when the amount of applied thermosetting or photocurable adhesive is nonuniform, or thermal distribution or Light irradiation is uneven, so that curing shrinkage of the adhesive becomes uneven, the above described wedge-shaped tips of a planar holder are in contact with a light reception plane-side surface of a solid-state image pickup element package, and therefore, even when curing shrinkage of the adhesive occurs, no impact is expected, i.e., positional deviation of the solid-state image pickup element can be prevented. Thus, connection and fixation can be performed with high precision, thereby making it possible to deal with an increase in number of pixels and reduction in size of the solid-state image pickup element.

In addition, because the planar holder is in contact with the light reception plane-side surface of the solid-state image pickup element package, no impact is caused by the shrinkage of the adhesive due to variations in ambient temperature during operation, and therefore the solid-state image pickup element package cannot be positionally changed. Thus, it is possible to provide high-definition images.

Further, because the planar holder is in contact with the light reception plane-side surface of the solid-state image pickup element package, the adhesive does not overflow onto the light reception plane side of the solid-state image pickup element during an operation of applying the adhesive. Thus, it is possible to prevent contamination of an optical system or irregular reflection, etc., of an optical image due to the adhesive.

2. According to the invention of the present application, in addition to achieving the effects of the preceding claim, a plurality of stacked planar holders having the same shape are bonded onto side faces of a prism such that their respective wedge-shaped tips are in contact with the above-described light reception plane-side surface of a sold-state image pickup element package, and the solid-state image pickup element package is connected and fixed to the plurality of planar holders by applying an adhesive in triangular gaps formed by the solid-state image pickup element package surface and wedge-shaped tip surfaces of the planar holders. Thus, a bonding area is increased two times or more to enhance adhesive strength, whereby it is possible to firmly bond and fix even a combination of an extremely small prism and a compact solid-state image pickup element package.

3. According to the invention of the present application, in addition to achieving the effects of the preceding claims, a bar is inserted in each of the above-described triangular gaps, so that the adhesive is applied in a reduced amount and dispersed, and a solid-state image pickup element package is connected and fixed to the above-described planar holder by inserting the bars into the triangular gaps formed by the above-described solid-state image pickup element package surface and the above-described wedge-shaped tip surfaces of the planar holder, such that the bars are in contact with the surfaces. Thus, no impact is expected even when curing shrinkage of the adhesive occurs.

4. According to the invention of the present application, it is possible to use, as the above-described bar, any transparent glass, ceramic or metal material having a thermal expansion coefficient approximating to a thermal expansion coefficient of a prism, and therefore it is possible to select a material that is to be used depending on bonding approaches for fixing and bonding the above-described planar holder to the prism by a 6-axis adjustment jig for a solid-state image pickup element.

5. According to the invention of the present application, even when the amount of applied thermosetting or photocurable adhesive is nonuniform, or thermal distribution or light irradiation is uneven, so that curing shrinkage of the adhesive becomes uneven, the above-described planar holder tip having a semicircular cross section is in contact with a light reception plane-side surface of a solid-state image pickup element package, and therefore, even when curing shrinkage of the adhesive occurs, no impact is expected, i.e., positional deviation of the solid-state image pickup element can be prevented. Thus, connection and fixation can be performed with high precision, thereby making it possible to deal with an increase in number of pixels and reduction in size of the solid-state image pickup element.

6. According to the invention of the present application, it is possible to use, as the above-described planar holder, any transparent glass, ceramic or metal material having a thermal expansion coefficient approximating to a thermal expansion coefficient of a prism, and therefore it is possible to select a material that is to be used depending on bonding approaches for fixing and bonding the above-described planar holder to the prism by a 6-axis adjustment jig for a solid-state image pickup element.

7. According to the invention of the present application, it is possible to use, as the planar holder and bar, a transparent glass material having a thermal expansion coefficient approximating to a thermal expansion coefficient of a prism, and it is possible to connect and fix the planar holder to a prism as well as to a solid-state image pickup element package by applying the above-described photocurable adhesive and curing it through light irradiation. Thus, it is possible to achieve effects of reducing the number of production man-hours and improving work efficiency.

8. According to the invention of the present application, it is possible to employ an approach in which a ceramic or metal material is used as the above-described planar holder and bar, and the planar holder is connected and fixed to a prism as well as to a solid-state image pickup element package by applying a thermosetting adhesive and curing the thermosetting adhesive with a heat source. Thus, it is possible to make easy adaptation to a fixing and bonding approach by the above-described 6-axis adjustment jig.

9. According to the invention of the present application, it is expected that, by containing translucent spherical fillers in the above-described adhesive, mechanical characteristics such as hardness are improved and polymerization shrinkage is reduced, resulting in a small thermal expansion coefficient.

What is claimed is:

1. Method of fixing prisms for a TV camera and solid-state image pickup element packages, comprising:
    fixing two holding plates at two sides of each of the prisms, each of the holding plates having a wedge-shaped or semicircular tip surface,
    abutting the wedge-shaped or semicircular tip surfaces of the holding plates always against a surface of the solid-state image pickup element package to form a gap directly between the surface of the solid-state pickup element package and the wedge-shaped or semicircular tip surface of the holding plate, respectively,
    supplying an adhesive in the gap formed directly between the surface of the solid-state image pickup element package and the wedge-shaped or semicircular tip surface of the holding plate, respectively, said adhesive being photocurable adhesive or thermosetting adhesive, aligning, relative to light axes, X, Y and Z axes and rotational axes θx, θy and θz for the axes X, Y, and Z of each of the solid-state image pickup element packages while inclining the holding plates in a front-rear direction simultaneously, the axes X, Y, and Z being perpendicular to each other, and curing the adhesive situated in the gap directly between the surface of the solid-state pickup element package and the wedge-shaped or semicircular tip surface of the holding plate by applying light or heat to thereby fix the holding plates, the solid-state image pickup elements and the prisms, respectively.

2. The method according to claim 1, wherein additional holding plates are directly laminated on the holding plates by an adhesive, which is cured by the light or heat when the holding plates, the solid-state image pickup elements and the prisms are cured.

3. The method according to claim 1, further comprising inserting the adhesive and a bar in the gap formed by the surface of the solid-state image pickup element package and the wedge-shaped or semicircular tip surface of the holding plate.

4. The method according to claim 3, wherein the bar is made of a material selected from the group consisting of transparent glass, ceramic and metal materials, the bar having a thermal expansion coefficient approximating to those of the prisms.

5. The method according claim 1, wherein the adhesive contains translucent spherical fillers.

6. The method according to claim 1, wherein the gap between the surface of the solid-state image pickup element package and the wedge-shaped has a triangular shape in cross section.

7. The method according to claim 6, wherein the adhesive is cured by irradiation of ultraviolet light.

* * * * *